United States Patent [19]
Gorsuch et al.

[11] Patent Number: 5,318,604
[45] Date of Patent: Jun. 7, 1994

[54] ABRASIVE ARTICLES INCORPORATING ABRASIVE ELEMENTS COMPRISING ABRASIVE PARTICLES PARTIALLY EMBEDDED IN A METAL BINDER

[75] Inventors: Ian Gorsuch, Biddenden; Timothy Lawson, Maidston, both of England

[73] Assignee: Minnesota Mining and Manufacturing Company, St. Paul, Minn.

[21] Appl. No.: 978,122

[22] Filed: Nov. 18, 1992

[51] Int. Cl.⁵ ............................................. B24D 3/00
[52] U.S. Cl. ...................................... 51/293; 51/295; 51/298; 51/309
[58] Field of Search .................. 51/293, 295, 298, 309

[56] References Cited

U.S. PATENT DOCUMENTS

| | | | |
|---|---|---|---|
| 2,216,728 | 10/1940 | Benner et al. | 51/280 |
| 3,329,489 | 7/1967 | Mason et al. | 51/298 |
| 3,385,684 | 5/1968 | Voter | 51/298 |
| 3,860,400 | 1/1975 | Prowse et al. | 51/295 |
| 3,864,101 | 2/1975 | Charvat | 51/298 |
| 4,047,902 | 9/1977 | Wiand | 51/295 |
| 4,078,906 | 3/1978 | Green | 51/295 |
| 4,256,467 | 3/1981 | Gorsuch | 51/295 |
| 4,681,600 | 7/1987 | Rhoades | 51/293 |
| 4,863,573 | 9/1989 | Moore et al. | 204/16 |
| 4,874,478 | 10/1989 | Ishak et al. | 204/16 |

FOREIGN PATENT DOCUMENTS

| | | |
|---|---|---|
| 698428 | 5/1967 | Belgium . |
| 2565870 | 12/1985 | France . |
| 1534448 | 12/1978 | United Kingdom . |

*Primary Examiner*—Mark L. Bell
*Assistant Examiner*—Willie J. Thompson
*Attorney, Agent, or Firm*—Gary L. Griswold; Walter N. Kirn; Jeffrey L. Wendt

[57] ABSTRACT

An abrasive article comprising abrasive elements dispersed in a binder matrix, the abrasive elements comprising individual particles of abrasive material, substantially all of which are partially embedded in a metal binder. The abrasive particles, when introduced into an electrolyte bath only during the final stages of an electrodeposition process, are embedded only on a major surface of the metal binder. Methods of making the abrasive elements and the abrasive articles are also presented as aspects of the invention.

28 Claims, 4 Drawing Sheets

ABRASIVE ARTICLES INCORPORATING ABRASIVE ELEMENTS COMPRISING ABRASIVE PARTICLES PARTIALLY EMBEDDED IN A METAL BINDER

BACKGROUND OF THE INVENTION

1. Field of the Invention

This invention relates to abrasive articles comprising a thermoplastic or thermosetting binder which binds abrasive elements to a backing. The abrasive elements comprise abrasive particles partially embedded into a major surface of a metal binder.

2. Related Art

It is commonplace in both domestic and industrial applications to abrade the surface of a workpiece to achieve a desired finish. Conventional abrading operations are performed by the rapid rotation or reciprocation of abrading tools of various configurations, such as wheels, discs, belts and the like, against the surface to be finished. These tools include at least one abrasive surface comprising particles of an abrasive material embedded in a binder matrix which presents a multiplicity of tiny cutting edges to the workpiece.

During the abrading operation, individual abrasive particles are occasionally removed from the surface of the abrasive tool as a result of drag forces produced by contact between the tool and workpiece, which loosen and ultimately unseat the particles. This is referred to as "pull-out" or "shelling", the effects of which can vary from a simple reduction in cutting efficiency to uneven wear and the spoiling of the finish of the workpiece. For example, loose abrasive particles can mark the surface of the workpiece, necessitating further finishing operations to restore the desired finish.

Pull-out is most pronounced with coarse grain abrasives, especially when abrading hard materials, as larger particles are more susceptible to abstractive forces. Consequently, pull-out is a particular problem in the stoneworking industry where abrasive tools are used to shape and finish stone, such as marble, granite and the like.

The present invention seeks to provide abrasive articles having a reduced susceptibility to pull-out.

U.S. Pat. No. 4,256,467 (Gorsuch et al.) describes flexible abrasive articles and methods for their production. In one method, a stainless steel or other electrically conductive metal cylinder is coated with a resist material except at discrete areas. The cylinder is then wrapped in an electrically insulating mesh material, the cylinder and mesh emersed in an electrolytic bath, and metal deposited electrolytically from the bath over areas of the cylinder not having been coated with resist. The metal is deposited through the mesh material, and abrasive particles are added to the bath toward the end of the deposition time period, thereby providing areas of metal deposits having abrasive particles partially embedded therein.

U.S Pat. No. 5,127,197 (Bruxvoort et al.) describes similar articles, wherein the metal deposits are adhered to a backing using a metallic adhesive.

Also of background interest are U.S. Pat. Nos. 2,820,746; 2,492,143; 3,860,400; 4,047,902; 4,078,906; 4,111,667; 4,214,877; 4,288,233; 4,576,612; 4,798,026; 4,826,508; 4,863,573; 4,874,478; and 5,011,511, World Patent Application WO 90/00105 (published Jan. 11, 1990); UK Patent Applications 2 200 920 A (published Aug. 17, 1988) and 2 164 053 A (published Mar. 12, 1986); and British Patent Specifications 760,526 (published Oct. 31, 1956); 1 247 764 (published Sep. 29, 1971); and 1 458 236 (published Dec. 8, 1976). The background art discloses variations of and improvements to the Gorsuch et al. technology previously discussed; however, they do not disclose abrasive elements such as formed by Gorsuch et al. dispersed in a non-metallic binder in an abrasive article.

World Patent Application WO 79/00778 (published Oct. 18, 1979) discusses U.S. Pat. No. 2,216,728, which discloses abrasive aggregates comprised of diamond abrasive particles held together by sintering in the presence of metals such as nickel having an embrittling additive therein. The aggregates are said to be useful in resin bonded grinding wheels wherein the aggregates are surrounded by a resin phase.

The provision of a patterned abrasive surface to enhance grinding results is known in the art, as disclosed in the above-mentioned U.S. Pat. No. 2,820,746 and World Patent Application WO 90/00105, and more recently with the introduction of "patterned" abrasives made using rotogravure methods, such as those disclosed in U.S. Pat. Nos. 4,773,920 (Chasman et al.) and 5,014,468 (Ravipati et al.), and assignee's copending United States application Ser. No. 07/651,660, filed Feb. 6, 1991.

In reviewing the art to date one fails to discover abrasive articles comprising a thermoplastic or thermoset binder having abrasive elements dispersed therein, the abrasive elements comprising abrasive particles partially embedded into a major surface of a metal binder. Although the above-mentioned U.S. Pat. No. 2,216,728 describes metal-bonded diamond aggregate abrasives surrounded by a resin binder, the addition of embrittling additives (such as tin) to copper is apparently used to control the "slow but necessary breakdown of the metal bonded aggregate during use." This effectively increases, rather than decreases, pull-out of the abrasive particles, an objective diametrically opposed to that of the present invention.

SUMMARY OF THE INVENTION

According to the present invention there is provided abrasive articles having an abrasive surface comprising abrasive elements dispersed in a binder matrix, which abrasive elements comprise individual particles of abrasive material, substantially all of which are partially embedded in a metal binder. By use of the phrase "partially embedded in a metal binder" it is meant that substantially all of the abrasive particles are deposited onto a surface of the metal binder and anchored therein, but not completely surrounded by metal binder, although a small percentage of abrasive particles may indeed be totally surrounded by metal binder. By use of the phrase "dispersed in a binder matrix" is meant that substantially all of the abrasive elements are surrounded by binder matrix, where "binder matrix" comprises an organic (e.g., thermoplastic, thermoset, or mixture thereof) resin, with the understanding that as abrasion begins, the abrasive elements are gradually exposed to the workpiece. The abrasive elements are preferably formed by electrodeposition of the metal in the presence of the abrasive particles.

The abrasive articles of the invention may be molded or formed in any of a wide variety of sizes, shapes and configurations, including wheels, discs, plain and tapered cups, sheets, pads, blocks, belts etc., and can be used to abrade a wide range of materials including metal, stone (such as marble and granite), glass and other materials which are normally difficult to abrade. The abrasive articles of the invention find particular utility with coarse abrasive materials and are suitable for use under both wet and dry abrading conditions.

The term "abrasive element" is used herein to describe a discrete structure formed by a plurality of abrasive particles bound together by a metal binder. The surface area of each abrasive element is greatly increased relative to the individual abrasive particles making up the element. The binder matrix is able to penetrate into the gaps and interstices formed between adjacent abrasive particles, effectively increasing the purchase (holding force) of the binder matrix on the element and rendering it less susceptible to abstractive forces. The abrasive elements may take a wide variety of sizes and shapes including both regular and irregularly shaped elements. The abrasive elements are ordinarily preformed and introduced into the uncured binder matrix.

Another aspect of the invention is a method of making the abrasive elements used in the abrasive articles of the invention, the method comprising the steps of:

(a) applying a nonconductive coating partially over a conductive surface to provide exposed separated conductive areas;

(b) depositing metal from a deposition solution of metal ions onto the surface to provide a plurality of separated metal bodies upon which will be deposited additional metal and abrasive particles;

(c) introducing abrasive particles into the deposition solution while continuing to deposit metal in an amount sufficient to anchor a plurality of abrasive particles to each metal body without entirely covering the abrasive particles; and (d) removing the abrasive elements from the surface.

Preferred are those methods wherein the nonconductive coating is an insulating solder resist material, and those methods wherein after step (a) but prior to step (b) the exposed separated conductive areas are coated with a release material.

Another method of making the elements comprises the steps of:

(a) applying a mesh material over a conductive surface, the mesh material having discrete nonconductive and conductive areas;

(b) placing the wrapped conductive surface of step (a) in a solution having metal ions therein capable of being electroplated or electroless plated;

(c) depositing metal ions onto and through the nonconductive areas of the mesh;

(d) introducing abrasive particles into the solution toward the end of the deposition period to form areas of deposited metal having abrasive particles partially embedded therein;

(e) removing the conductive surface of step (d) from the solution and subsequently removing the mesh material therefrom; and (f) exposing the mesh material of step (e) to conditions sufficient to dissolve the mesh, thereby forming individual abrasive elements.

Preferred are those methods wherein the mesh is a thermoplastic material dissolvable by acids, bases, and/or organic solvents. Particularly preferred are those methods wherein the thermoplastic material is polyester cloth and the exposure conditions include exposing the polyester cloth to an aqueous basic solution having a concentration and for a time sufficient to dissolve the polyester.

The electrodeposition steps of the method of making the abrasive elements can be any suitable electrodeposition technique known in the art, including those disclosed in Belgian Patent No. 622162, German Patent No. 1059754 and British Patent Nos. 1375571 and 1458236. Preferred electrodeposition techniques are disclosed in U.S. Pat. No. 4,256,467, incorporated by reference herein, and described hereinafter with reference to FIGS. 2b to 2d.

Methods of making abrasive articles comprising the abrasive elements of the invention are another aspect of the invention. The methods include dispersing abrasive elements in a binder precursor, the abrasive elements comprising individual particles of abrasive material, all of which are at least partially but not totally embedded in a metal binder, the abrasive elements being formed as above described, and exposing the binder precursor to conditions sufficient to cure the binder precursor.

Binder materials used as the binder matrix may comprise any material useful in making abrasive products, including both organic and inorganic binder materials. Organic binders are preferred.

The binder used to form the abrasive element may comprise any metal (or such other material) capable of being electrodeposited. Preferred metals include copper, silver and especially nickel. Combinations of metals produced by successive electrodeposition of two or more different metals may also be employed.

The abrasive material may comprise any material useful in making abrasive products including alumina ($Al_2O_3$) and diamond, although non-conductive materials are preferred for use with the electrodeposition techniques employed in the present invention. Diamond is the preferred abrasive material, as well as coated diamonds.

Further aspects and advantages of the invention will now be described by way of example and with reference to the accompanying drawings.

DESCRIPTION OF PREFERRED EMBODIMENTS

Figure 1:
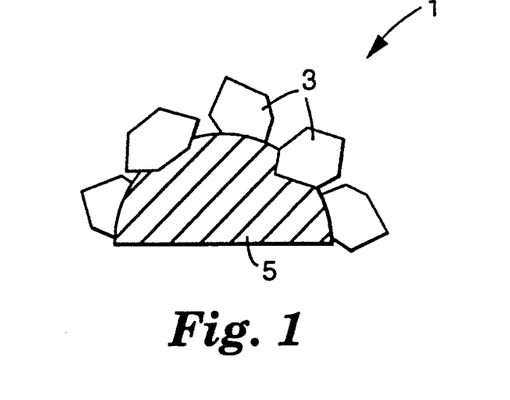
FIG. 1 is a cross-sectional view of a hemispherical abrasive element for use in the present invention.

FIG. 1 is a schematic illustration of a single abrasive element (denoted generally by 1). Abrasive element 1 comprises particles 3 of an abrasive material partially embedded in a metal binder 5. Abrasive particles 3 project outwardly from binder 5 to provide a multiplicity of cutting edges. The binder matrix of the abrasive surface is able to penetrate the gaps and interstices formed between adjacent abrasive particles in the element, thereby increasing the holding capacity of the binder matrix on the elements when compared with individual abrasive particles. Typically only from about 30% to about 50% of the individual abrasive particle is embedded in the metal binder.

In the embodiment illustrated in FIG. 1, abrasive element 1 is substantially hemispherical, but any useful size, shape and configuration of element may be employed.

As "pull-out" is more prevalent with coarse abrasives, the present invention finds particular utility in the preparation of such materials, generally where the average size of the abrasive particles is about 250 micrometers. The size of the abrasive elements will vary somewhat with the grade of abrasive desired, but hemispherical elements having an average diameter ranging from about 0.5 to about 3 mm are usually adequate for most purposes. More preferably the elements have an average diameter ranging from about 0.5 to about 2 mm. Generally, each element contains at least five abrasive particles, preferably from about 10 to 20 particles.

The amount of abrasive material incorporated into each element will vary with the grade of abrasive desired and the intended application of the abrasive article, but generally, each element comprises from about 0.5 to 10%, preferably about 0.5 to 5% by weight of the abrasive material.

The abrasive elements may be formed using any appropriate electrodeposition technique. In a method described in U.S. Pat. No. 4,863,573, incorporated herein by reference, the abrasive elements are formed by laying a length of mesh material onto an electrically conducting surface and electrodepositing a metal onto the mesh material in the presence of an abrasive mineral such that the mineral becomes partially but not totally embedded in the metal. An insulating material (sometimes referred to in the art as a "resist") is selectively applied to the mesh material before deposition of the metal such that the metal can only deposit onto the mesh in those areas not covered by the insulating material, thereby defining the shape and size of the abrasive elements.

Figure 2A:
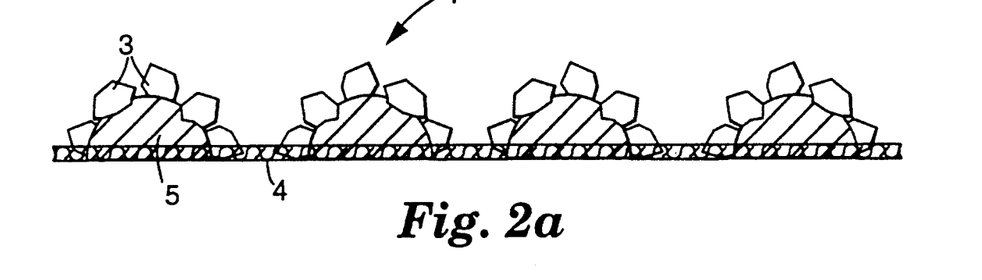
FIG. 2a is a cross-sectional view of a mesh material onto which have been formed a plurality of the abrasive elements of FIG. 1.

FIG. 2a illustrates this method of making an electrodeposited abrasive layer. A mesh material 4 in the form of a woven fabric of electrically insulating material, such as polyamide, cotton, polyesters such as copolymers of terephthalic acid and ethylene glycol (such as that known under the trade designation "Terylene") or the like, is screen printed with insulating material in the form of ink. The ink, may be a resin based or oil based ink.

The screen printing may be conducted by conventional screen printing techniques in such a manner to ensure that the ink penetrates into and is absorbed onto defined areas of the mesh material leaving discrete areas without any insulating material which define the abrasive element. Such discrete areas may be of any convenient shape and size, e.g., circular, diamond-shaped, rectangular etc.

The mesh material is laid onto an electrically conductive, preferably smooth, surface and metal 5 electrodeposited directly onto the surface through the mesh material so that mesh material 4 becomes embedded in and adhered to the metal layer. Abrasive particles 3 are added to the electrolytic bath toward the end of the deposition period. Mesh 4 and associated metal layer 5 with embedded abrasive particles 3 is readily stripped from the electrically conductive surface. While it is possible to form the abrasive elements directly onto the electroconductive surface without using the mesh material by applying an electrically insulating material over selected areas of the surface so that the metal layer is deposited only over the remaining uncoated areas, the removal of the particles is more difficult and can damage the surface.

Figure 2B:
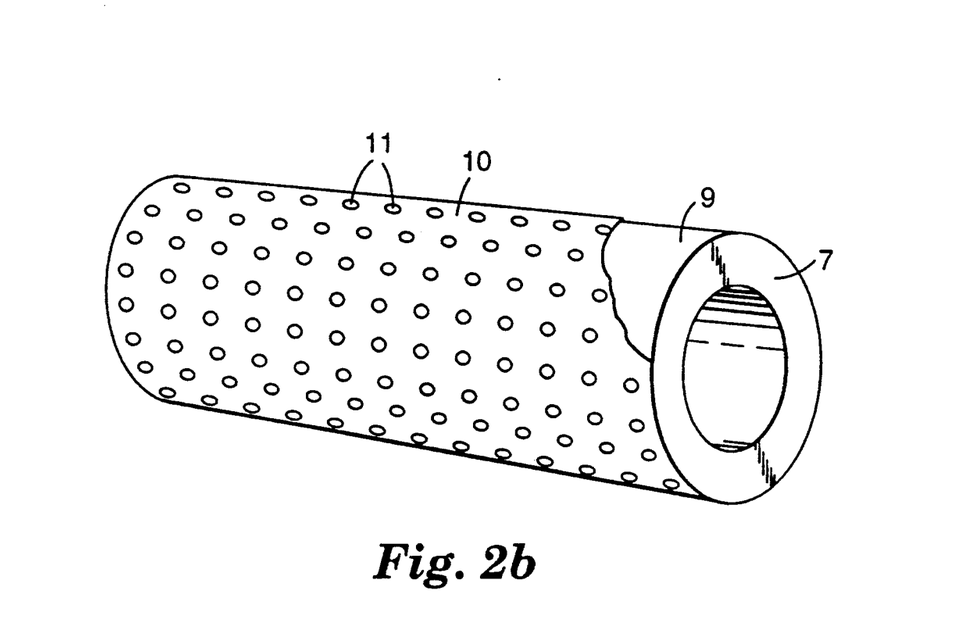
FIG. 2b is a perspective view of a cylinder on which the abrasive elements of FIG. 1 can be made.
Figure 2C:
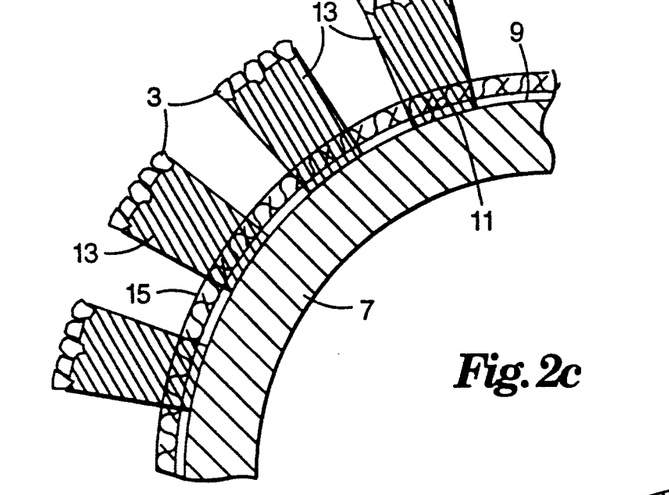
FIG. 2c is a cross-sectional view illustrating, on an exaggerated scale, another embodiment of an abrasive element formed on the cylinder of FIG. 2b.
Figure 2D:
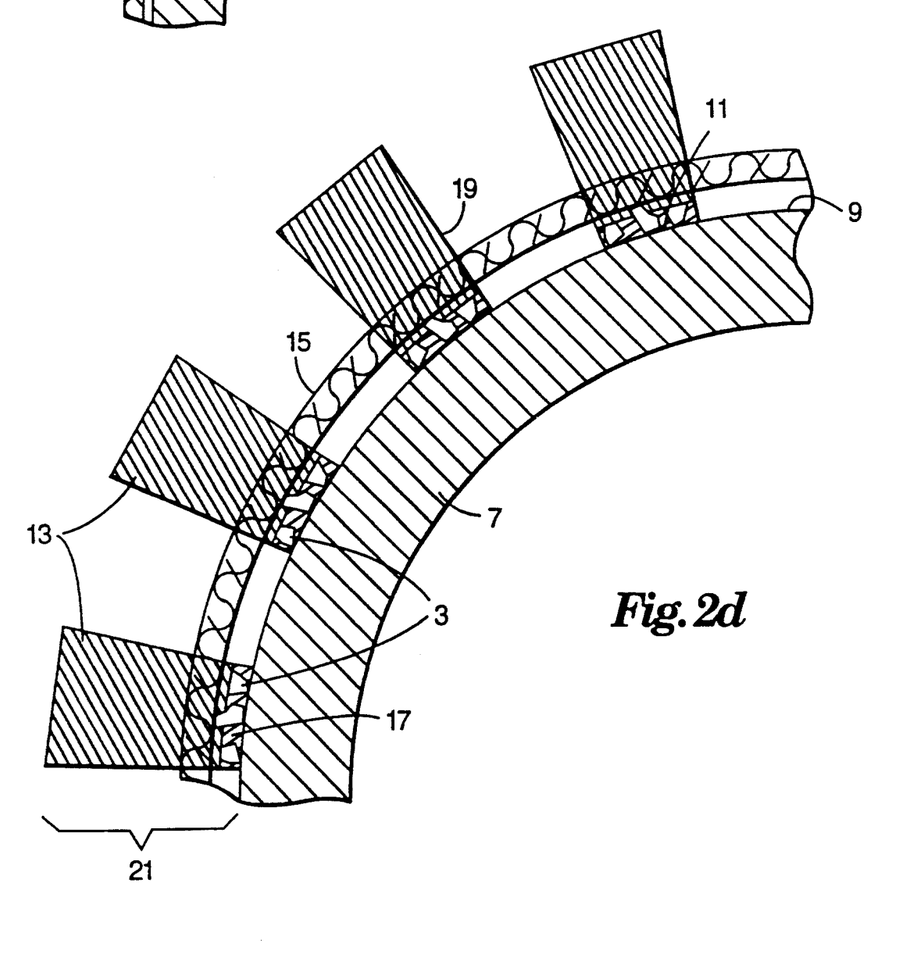
FIG. 2d is a view similar to FIG. 2c of yet another embodiment of an abrasive element.

A particularly preferred electrodeposition technique will now be described with reference to FIGS. 2b to 2d. The electrodeposition technique is known in the art and disclosed in U.S. Pat. No. 4,256,467, previously incorporated by reference. Referring to FIG. 2b, a cylinder 7 formed of stainless steel or other electrically conductive metal having a smooth cylindrical surface 9 is coated with an electrically insulating acid resist at areas denoted as 10 except for discrete, spaced, in this case circular, areas 11. The surfaces of these areas 11 are treated with a release material in known manner to prevent the adhesion of electro-plated metal. One such release material found useful is the automobile wax known under the trade desigantion "Minute Wax", available from Turtle Wax Manufacturing Ltd., England. A length of flexible mesh (not shown) is then stretched tightly around cylinder 7 which is then immersed in an electrolyte bath (again not shown) of known form containing a metal electrolyte of any metal capable of being electro-plated or electroless plated, preferably nickel or copper.

In one method, described with reference to FIG. 2c, metal 13 is deposited electrolytically onto and through mesh 15 onto cylinder 7 so that mesh 15 becomes embedded in the metal 13. A thickness of metal 13 is deposited until almost the full eventual, desired thickness is reached. Abrasive particles 3, in the form of diamond, cubic boron nitride, silicon carbide or other suitable abrasive material, are then introduced into the electrolyte bath in suspension whereupon such material becomes randomly deposited on the metal 13. Deposition of metal 13 then continues until abrasive particles 3 are partially but not totally embedded in the outer layer of metal 13. The cylinder, now having a covering of mesh, metal and abrasive particles, is then removed from the bath and rinsed before stripping the mesh material.

In another method, described with reference to FIG. 2d, the same cylinder 7 is immersed in the electrolyte solution and deposition of metal over the exposed surfaces 11 of the cylinder 7 is commenced. Abrasive particles 3 present in the electrolyte solution simultaneously settle onto the exposed surfaces 11 so that during deposition abrasive particles 3 become embedded in a thin layer 17 of metal.

When sufficient abrasive particles 3 have been embedded in the initial metal layer 17, cylinder 7 is removed from the solution and washed and dried. A length of mesh 15 is wound tightly around cylinder 7 having its layer 17 of metal and abrasive particles 3 in place. Cylinder 7 is replaced in the electrolyte solution and electroplating is recommenced, this time laying down a second layer 19 of metal, onto and through mesh 15 and onto the previously-formed layer 17 to form an integral layer 21. On completion of the second layer 19 of metal, i.e., when it has reached its desired thickness, cylinder 7 is removed and rinsed and the mesh 15 stripped from the cylinder.

In the latter case, the operative points of the abrasive particles 3 are on one surface of the material 18 and all lie on substantially the same plane, flush with the surface in contact with the smooth surface(s) of cylinder 7. As the abrasive particles are not as exposed as in the method described with reference to FIG. 2c, the method and abrasive element of FIG. 2d are not as preferred.

In the deposition methods described herein the electrolytic bath typically consists essentially of water and the metal ion(s) to be deposited. In embodiments wherein nickel is deposited, the bath will preferably contain from about 30 to about 50 weight percent nickel sulfamate, more preferably from about 35 to about 45 weight percent nickel sulfamate.

An important aspect of the invention for all embodiments is that the abrasive elements so formed on the mesh material may have the mesh material 15 dissolved therefrom by immersing (or spraying followed by immersing) the abrasive element-laden mesh material with a solvent, an acid, a base, or a combination thereof. As used herein, "acid" is defined as an aqueous composition having negative base ten logarithm of the hydrogen ion concentration of less than 7.0, while "base" is defined as an aqueous composition having negative base ten logarithm of the hydrogen ion concentration of greater than 7.0. Of course, it will be appreciated by those skilled in the art that acids, bases, and solvents which might have an adverse effect on the metal and/or abrasive particles are to be avoided, those having an adverse effect being easily found with minimum experimentation.

Acids which may be used for dissolving the mesh include hydrochloric acid, sulfuric acid, nitric acid, combinations thereof, and the like, while suitable basic materials include sodium hydroxide, potassium hydroxide, and the like. Suitable organic solvents include lower aliphatic and cyclic hydrocarbon solvents such as hexane, heptane, cyclohexane, and the like.

One particularly preferred method of mesh dissolution, used when the mesh material is polyester, is to soak the abrasive element-laden mesh in a 40% by weight aqueous sodium hydroxide (NaOH) solution.

Figure 3:
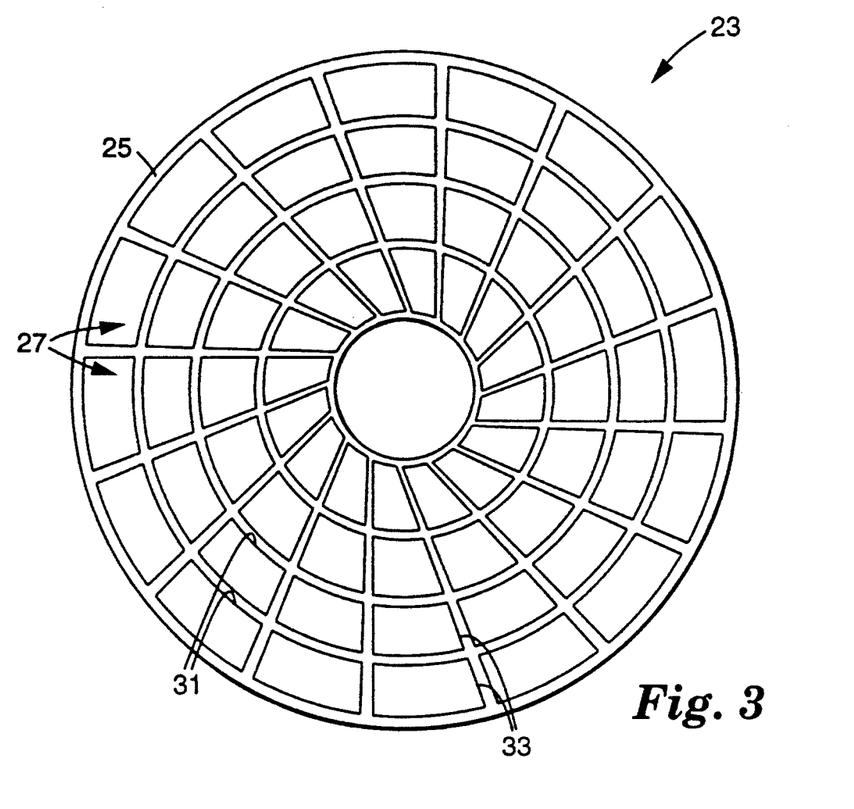
FIG. 3 is a plan view of an abrasive disc in accordance with the invention.
Figure 4:
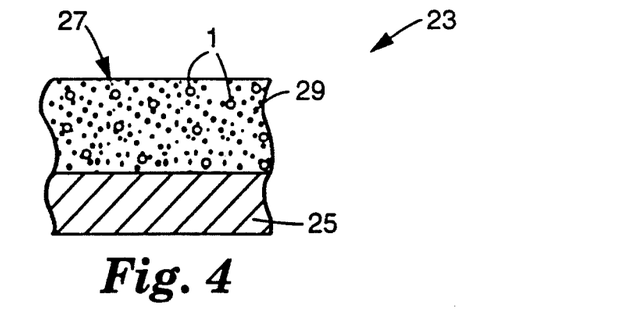
FIG. 4 is a cross-sectional view of the abrasive disc of FIG. 3.
Figure 5:
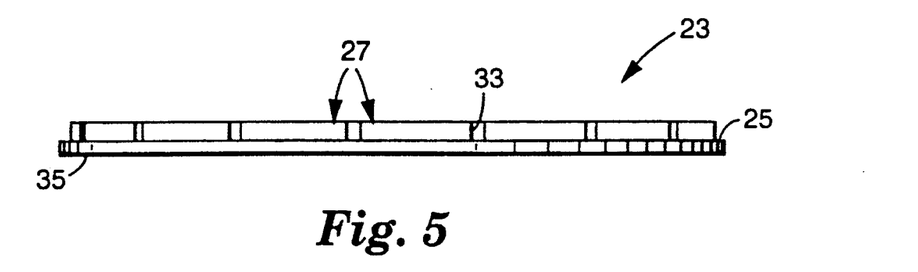
FIG. 5 is a side elevation view of the abrasive disc of FIG. 3.

FIGS. 3-5 illustrate one embodiment of an abrasive article in accordance with the invention namely, an abrasive disc (denoted generally by 23) for use with a rotary sander (not shown). The abrasive disc 23 generally comprises a backing layer 25 having on one side thereof an abrasive layer 27 comprising a binder matrix 29 into which is dispersed the abrasive elements 1 (see FIG. 4). Aside from the presence of the abrasive elements, the disc is entirely conventional. Examples of such discs are commercially available from Interface Developments Ltd., under the trade name "Flexible Resin Diamond Disc."

The abrasive layer 27 is formed with a plurality of interconnecting annular 31 and radial 33 channels or grooves which facilitate the removal of abraded material and coolant from the work surface and allow the disc 23 a degree of flexure. These grooves are formed by the mold cavity used to produce the abrasive article. Typically and preferably the channels have a depth of about 0.25 to about 0.5 times the thickness of the disc, while the width of the channels can vary considerably but are preferably from about 1 mm to about 1 cm. It should be understood that the channels may or may not be utilized in every case, and that the width, depth, and other design details are largely a function of the particular job to be performed.

The rear, non-coated side 35 of the backing layer 25 may optionally be provided with means (not shown) to secure disc 23 to the back-up pad of the sander, e.g., the backing layer may be provided with one portion of a conventional hook and loop type fastener, or with a pressure-sensitive adhesive.

As previously noted, binder materials used as the binder matrix may comprise any material useful in making abrasive products, including both organic and inorganic binder materials. Organic binder materials, including both natural and especially synthetic resins, are preferred for use as the binder matrix. Particularly preferred resins include well known cross-linked resins, such as acrylic resins, epoxy resins, phenolic resins, phenol-aldehyde resins, melamine-aldehyde resins and urea-aldehyde resins, although the choice of resin will depend to a large extent on the intended use of the abrasive article. Preferred resins are epoxy resins, including epoxy novolacs. Other useful resin systems include thermostable resins, such as polybenzimidazoles, e.g., as disclosed in U.S. Pat. No. 3,329,489; polyimides, e.g., as disclosed in U.S. Pat. Nos. 3,295,940 and 3,385,684; polysulfides, e.g., as disclosed in U.S. Pat. No. 3,303,170, and polypyrrones. For use in making coated abrasive products, such as discs or belts, liquid resin systems are usually preferred.

The binder matrix preferably comprises an organic resin binder, although any useful binder medium known in the art of abrasive materials may be employed. Preferred resin binders are phenolic and epoxy binders. Examples of suitable epoxy binders include those commercially available from Ciba Geigy under the trade designations "AV 119", "AV 129/HV 935B" and "AV 129/HV 997." An example of a suitable phenolic binder is that known under the trade designation "XDF 4252", commercially available from Dynochem.

The binder matrix of the abrasive articles of the invention may also include one or more additives known in the art including fillers, lubricants, anti-loading agents, thickeners, anti-static agents, defoamers, wetting agents, and pigments, such as talc, titanium dioxide and carbon black. Although the abrasive articles of the invention are most typically used under wet abrading conditions, additives such as metal flakes, carbon black and graphite are particularly useful for dry abrading as they confer antistatic properties to the abrasive articles.

The abrasive material may comprise any material useful in making abrasive products including alumina ($Al_2O_3$), alumina zirconia, aluminum boride, beryllium carbide, beryllium oxide, boron nitride, boron phosphide, ceramic aluminum, diamond, emerald, flint, garnet, hematite, hafnium carbide, magnesium oxide, molybdenum carbide, niobium carbide, pumice, quartz, ruby, silica sand, silicon, silicon boride, silicon carbide, silicon nitride, tantalum boride, titanium boride, titanium carbide, tungsten carbide, vanadium boride, vanadium carbide, vermiculite and zirconium carbide, although non-conductive materials are preferred for use with the electrodeposition techniques employed in the present invention.

Diamond is the preferred abrasive material. Coated diamonds, e.g., as disclosed in Belgian Pat. Nos. 683508 and 698428 and French Pat. Nos. 1142688 and 1522735 are also useful. Suitable coating materials include both metals, such as copper, nickel, silver, cobalt and molybdenum, and non-metals.

The abrasive particles will preferably have an average particle size ranging from about 100 to about 300 micrometers. A particularly preferred average particle size is 250 micrometers.

The discs are conveniently produced by dispersing abrasive elements into an uncured binder precursor, pouring the resulting mixture into a suitable mold and allowing the mixture to cure. The morphology and abrasive content of the abrasive element will vary depending on the intended use of the abrasive disc but, by way of example, a disc suitable for sanding granite has been obtained by incorporating abrasive elements of the type described previously having the following specification:

Shape: hemispherical
Size: 1 mm (largest dimension)
Abrasive material: diamond (uncoated)
Total Abrasive content: 2% (w/w)
Avg. abrasive content per element: 21.65% (w/w)
Avg. Size of abrasive particles: 250 micrometers
Average no. of particles per element: 10 to 20
Binder: nickel The present invention will now be described with reference to the accompanying Examples, wherein all parts and percentages are by weight unless otherwise specified.

EXAMPLES

Example 1: Method of Making Abrasive Elements

Abrasive elements useful in the invention and described hereinabove with reference to FIG. 2c were made by the following method. A stainless steel cylinder, 40 cm diameter, was patterned with a series of 1 mm circular non-coated areas using an insulating solder resist known under the trade designation "XZ15T", available from Coates Circuit Products, Ltd. The circular non-coated areas were then coated with an automobile wax known under the trade designation "Minute Wax". The partially coated cylinder was wrapped tightly with a woven polyester cloth and subsequently fully emersed in an electrolyte bath which had about 40 weight percent nickel sulfamate dissolved in water. The woven polyester cloth was that known under the trade designation "PES 55/27", available from Sericol. The cylinder was electrically connected as the cathode to a 12 volt power source and the power supplied to the system. After about 75 minutes of only metal deposition, diamond abrasive particles having 250 micrometer avg. particle size were introduced into the bath. After a further 190 minutes of abrasive particle/metal deposition (to a total thickness of about 1 mm), the power was turned off and the cylinder removed from the bath and rinsed with tap water. The cylinder then appeared as illustrated in FIG. 2c. The woven polyester cloth was then peeled from the cylinder.

A 40 weight percent aqueous solution of NaOH was then prepared and used to dissolve the woven polyester cloth. The cloth as peeled from the cylinder was simply soaked in the NaOH solution at room temperature until the polyester material was fully dissolved, yielding abrasive elements consisting of nickel binder and diamond abrasive particles partially but not totally embedded in the surface of the nickel.

Example 2 and Comparative Example A

Comparative Abrasion Testing

This Example serves to illustrate the advantages of abrasive discs prepared in accordance with the invention, using the abrasive elements prepared in Example 1.

The following comparative test was conducted using two 10 cm abrasive discs of the type illustrated in FIGS. 3-5, identical in all respects save the disc (hereinafter "Abrasive Disc Comparative Example A") contained 2% by weight of 250 micrometer diamond grit and the other (hereinafter "Abrasive Disc Example 2") 2% by weight of the same diamond grit but partially embedded in nickel pellets as described in Example 1 and with reference to FIG. 2c. Each disc was mounted onto a hand-operated rotary angle grinder known under the trade designation "Flex 1103" running at 3600 rpm and used to flat sand 15 cm square blocks of black granite known under the trade designation "NERO IMPALA" (also known as "BON ACCORD"), available from most stone suppliers, for a period of 10 minutes. Water was used as the coolant for both sanding operations. A hand pressure of about 2.5 psi (176 g/cm$^2$) was used, and the stock removed (in grams) was recorded at 1 minute intervals, as measured by subtracting the weight of the sample after grinding from that before grinding.

Figure 6:
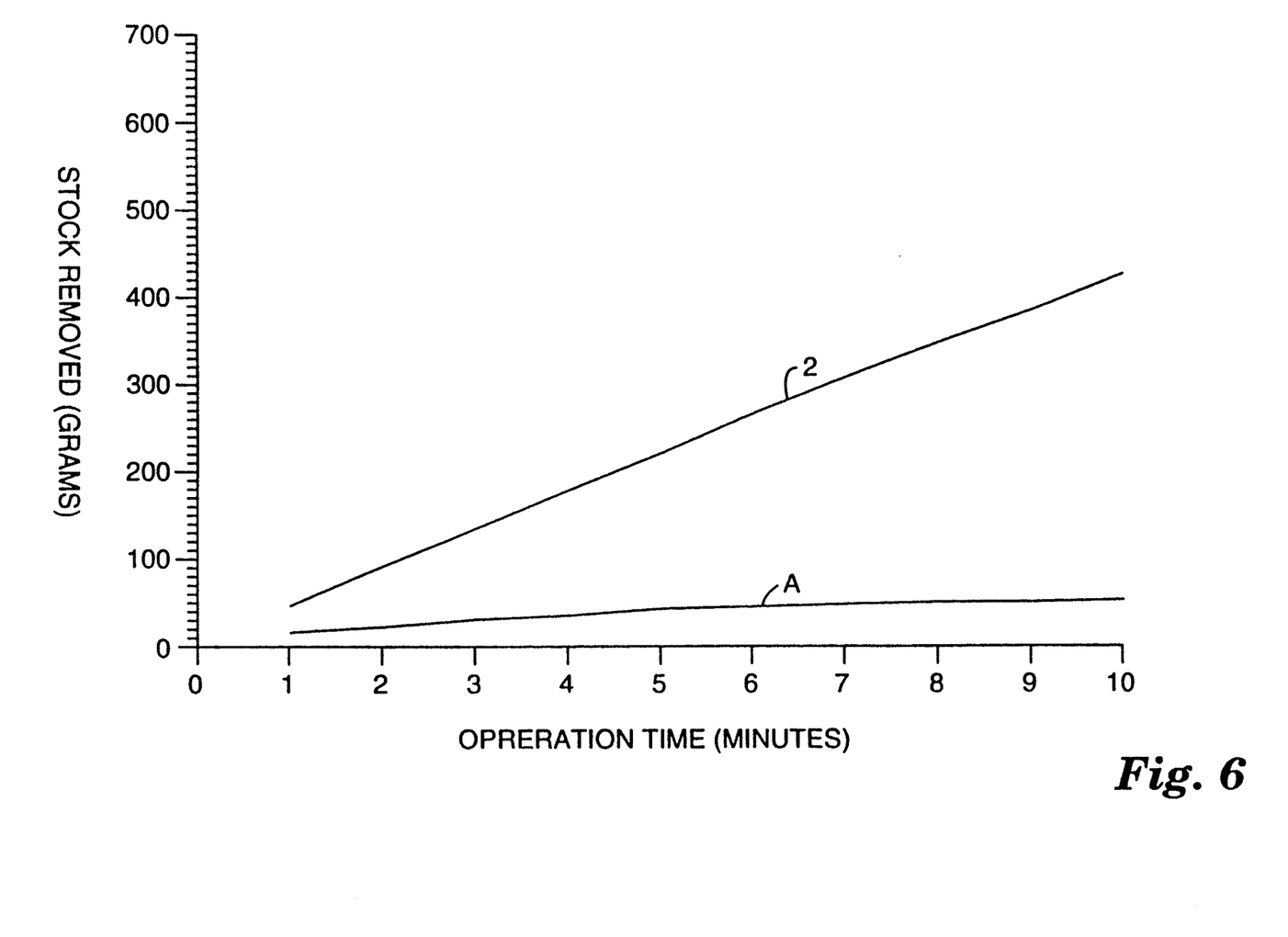
FIG. 6 is a graph comparing the abrading efficiency of an abrasive disc in accordance with the invention with a conventional abrasive disc.

The grinding results obtained are shown in FIG. 6 of the accompanying drawings. After 10 minutes grinding time, Abrasive Disc Example 2 had removed a total of 426 g whereas the Abrasive Disc Comparative Example A had removed only 52 g, clearly illustrating the increased abrading efficiency of discs prepared in accordance with the invention.

Various modifications and alterations of this invention will become apparent to those skilled in the art without departing from the scope and spirit of the invention, and it should be understood that this invention is not to be unduly limited to the illustrative embodiments set forth herein.

We claim:

1. An abrasive article comprising abrasive elements dispersed in a resin binder, the abrasive elements each comprising a plurality of individual particles of abrasive material anchored in a single electro deposited metal body.

2. The abrasive article of claim 1 wherein the abrasive material is selected from alumina, alumina zirconia, aluminum boride, beryllium carbide, beryllium oxide, boron nitride, boron phosphide, ceramic aluminum, diamond, emerald, flint, garnet, hematite, hafnium carbide, magnesium oxide, molybdenum carbide, niobium carbide, pumice, quartz, ruby, silica sand, silicon, silicon boride, silicon carbide, silicon nitride, tantalum boride, titanium boride, titanium carbide, tungsten carbide, vanadium boride, vanadium carbide, vermiculite and zirconium carbide, and a combination thereof.

3. The abrasive article of claim 2 wherein the abrasive material is diamond.

4. The abrasive article of claim 1 in which the abrasive particles have an average particle size ranging from about 100 to about 300 micrometers.

5. The abrasive article of claim 1 wherein the metal is selected from copper, nickel, silver, and a combination thereof.

6. The abrasive article of claim 5 wherein the metal is nickel.

7. The abrasive article of claim 1 in which the resin binder is selected from the group consisting of acrylic, epoxy, melamine-aldehyde, phenolic, phenol-aldehyde, and urea-aldehyde resins, and a combination thereof.

8. The abrasive article of claim 7 in which the resin binder is an epoxy resin.

9. The abrasive article of claim 1 wherein the abrasive particles comprise from about 0.5 to about 10% by weight of the abrasive element.

10. The abrasive article of claim 9 wherein the abrasive particles comprise from about 0.5 to about 5% by weight of the abrasive element.

11. The abrasive article of claim 10 wherein the abrasive particles comprise from about 1 to about 3% by weight of the abrasive element.

12. The abrasive article of claim 1 wherein the total weight of abrasive particles per weight of abrasive element is no more than about 50%.

13. The abrasive article of claim 1 wherein the total weight of abrasive particles per weight of abrasive element ranges from about 10 to about 30%.

14. The abrasive article of claim 1 wherein the total weight of abrasive particles per weight of abrasive element ranges from about 20 to about 25%.

15. The abrasive article of claim 1 wherein each abrasive element has on average at least about 5 abrasive particles.

16. The abrasive article of claim 1 wherein each abrasive element has on average from about 10 to about 50 abrasive particles.

17. The abrasive article of claim 1 wherein the abrasive elements are substantially hemispherical.

18. The abrasive article of claim 17 wherein the abrasive elements have an average diameter ranging from about 0.5 to about 3 mm.

19. The abrasive article of claim 18 wherein the abrasive elements have an average diameter ranging from about 0.5 to about 2 mm.

20. The abrasive article of claim 1 attached to a backing layer.

21. The abrasive article of claim 1 in the form of a wheel, disc, cup, block, sheet, pad or belt.

22. A method of making abrasive elements, the method comprising the steps of:
(a) applying a nonconductive coating partially over a conductive surface to provide exposed separated conductive areas;
(b) depositing metal from a deposition solution of metal ions capable of being electroplated or electroless plated onto said surface to provide a plurality of separated metal bodies upon which will be deposited additional metal and abrasive particles;
(c) introducing abrasive particles into the deposition solution while continuing to deposit said metal in an amount sufficient to anchor a plurality of abrasive particles to each metal body without entirely covering said abrasive particles; and
(d) removing said abrasive elements from said surface.

23. Method in accordance with claim 22 wherein said nonconductive coating is an insulating solder resist material.

24. Method in accordance with claim 23 wherein after step (a) but prior to step (b) the exposed separated conductive areas are coated with a release material.

25. A method of making abrasive elements comprising the steps of:
(a) applying a mesh material over a conductive surface, the mesh material having discrete nonconductive and conductive areas;
(b) placing the wrapped conductive surface of step (a) in a solution having metal ions therein capable of being electroplated or electroless plated;
(c) depositing said metal ions onto and through the nonconductive areas of the mesh;
(d) introducing abrasive particles into the solution toward the end of the deposition period to form areas of deposited metal having abrasive particles anchored therein; and
(e) removing the conductive surface of step (d) from the solution and subsequently removing the mesh material therefrom; and
(f) exposing the mesh material of step (e) to conditions sufficient to dissolve the mesh, thereby, forming individual abrasive elements.

26. Method in accordance with claim 25 wherein the mesh is a thermoplastic material dissolvable by acids, bases, and/or organic solvents.

27. Method in accordance with claim 26 wherein said thermoplastic material is polyester and said conditions comprise exposing the polyester to an aqueous basic solution having a concentration and for a time sufficient to dissolve the polyester.

28. Method of making an abrasive article comprising dispersing abrasive elements in a binder precursor, said abrasive elements each comprising individual particles of abrasive material all of which are anchored in a metal binder, the abrasive elements being formed by electrodeposition of the metal in the presence of the abrasive particles, and exposing the binder precursor to conditions sufficient to cure the binder precursor.

* * * * *

UNITED STATES PATENT AND TRADEMARK OFFICE
CERTIFICATE OF CORRECTION

PATENT NO. : 5,318,604
DATED      : June 7, 1994
INVENTOR(S): Ian Gorsuch and Timothy Lawson It is certified that error appears in the above-identified patent and that said Letters Patent is hereby corrected as shown below:

On the title page, item [30] should be inserted as follows:

-- Foreign Application Priority Data
   December 10, 1991 [UK] United Kingdom 9126216.2 --

Signed and Sealed this

Twenty-fifth Day of October, 1994

Attest:

BRUCE LEHMAN

Attesting Officer    Commissioner of Patents and Trademarks